United States Patent [19]

Janisch

[11] Patent Number: 5,070,851
[45] Date of Patent: Dec. 10, 1991

[54] AIR FUEL MIXING DEVICE FOR PRODUCER GAS

[75] Inventor: Douglas G. Janisch, Mequon, Wis.

[73] Assignee: Briggs & Stratton Corp., Wauwatosa, Wis.

[21] Appl. No.: 542,321

[22] Filed: Jun. 22, 1990

[51] Int. Cl.⁵ ............................................ F02M 21/04
[52] U.S. Cl. .................................................... 123/527
[58] Field of Search ...................... 123/527, 1 A, 525; 48/189.4, 180.1

[56] References Cited

U.S. PATENT DOCUMENTS

| 986,754 | 3/1911 | Podhajsky . | |
|---|---|---|---|
| 2,939,775 | 6/1960 | Middleton et al. | 123/527 |
| 4,497,304 | 5/1985 | Wintrell et al. | 123/527 |
| 4,519,363 | 5/1985 | Bernardoni et al. | 123/432 |

FOREIGN PATENT DOCUMENTS 8603136  7/1988  Netherlands ........................ 123/527

OTHER PUBLICATIONS

Design, Development and Performance of a Small-Scale Rice Hull Gasifier-Engine System for Continuous Operation (Master of Science Thesis), V. M. Tiangco, 1986, pp. 1-85.
Effect of Compression Ratio on Performance of Single Cylinder Spark Ignition Engine Fueled with Producer Gas Generated from Rice Hulls (Mast. of Science Thesis) I. R. Camacho, 1988, pp. i-x, and 1-7.

Primary Examiner—Andrew M. Dolinar
Attorney, Agent, or Firm—Andrus, Sceales, Starke & Sawall

[57] ABSTRACT

A fuel/mixing device for mixing producer gas with air is provided to generate a suitable air/fuel mixture for firing an internal combustion engine. Stepped venturi inlets are utilized, whereby the gas is expanded as the air is reduced, to both accelerate and mix the gas with the air as it is introduced into the throat of a carburetor. Means are provided for adjusting the air flow without disturbing the standard throttle on the carburetor. The mixing device is adapted to be mounted on existing carburetors, permitting retrofitting of existing equipment. The device permits start-up with gasoline and a smooth transition from gasoline fuel start-up to full operation on producer gas.

13 Claims, 2 Drawing Sheets

AIR FUEL MIXING DEVICE FOR PRODUCER GAS

BACKGROUND

1. Field of the Invention

The present invention relates to a fuel/air mixing device particularly suited for mixing producer gas with air to fire an internal combustion engine.

2. Description of the Prior Art

Petroleum shortages and its high cost are helping destroy the hard won economic gains of the developing countries. This growing dilemma over petroleum provides the incentive to investigate alternative fuels, especially those suited for direct use in existing engines and machines. One of the alternative fuels which is receiving recognition and gaining prime importance for research and development and application is producer gas. This gas is a product of gasification which thermally converts solid fuel into a combustible gas.

Producer gas technology is not a new development. It was used in blast furnaces about two centuries ago and was developed and used in Europe and Asia to run cars, tractors, and trucks during World War II. An early system for providing an air and gas mixture to fire an internal combustion engine is disclosed in U.S. Pat. No. 986,754, issued to O. Podhajsky on Mar. 14, 1911. The use of producer gas was rapidly discarded after World War II as low cost petroleum-based energy became readily available.

Recent shortages and the rapidly escalating cost of petroleum products have renewed interest in gasification as a potential economic source of energy To reduce tion as a potential economic source of energy. To reduce to be able to use producer gas generated from bio-mass, such as wood, straw, husk from rice, and other cereal crops, tree groomings and other agricultural residues and energy crops to run engines for the agricultural industry and other energy needs.

At present, gasification research and development has taken two major routes, one of which is the development of small scale, technological simple down draft designs for use in developing countries. The other is the large scale automated and continuous feed systems for developed or industrialized nations. The present invention was specifically designed for use with producer gas generated by the small scale, down draft designs for use in remote areas, although it is equally well suited for other types of producer gas generators. In particular, the present invention permits operation of an internal combustion engine with a low pressure fuel source. The flow of fuel is maximized while the flow of air can be selectively controlled to control the air/fuel mix. The system is readily adapted to existing carburetor engines without altering the carburetor or standard throttle system.

SUMMARY OF THE INVENTION

The present invention is an air/fuel mixing device for mixing producer gas with atmospheric air to provide a suitable air/fuel mixture for firing an internal combustion engine. The mixing device is designed to be readily adapted to a standard carburetor. The original carburetor, throttle and governor control of the gasoline carburetor is retained, and the mixing device of the invention is added to this in kit form. This permits retrofitting and/or field fitting of the device to existing equipment, and further, preserves the ability to use conventional fuels to cold start the engine without modification to existing systems.

The invention utilizes a pair of concentric, stepped venturi inlets wherein the producer gas is introduced into an expanding venturi simultaneously and concentrically with the introduction of air through a reducing venturi, accelerating and comingling the fuel and air to provide a suitable mixture for introduction into the throat of a typical carburetor. One unique feature of the invention is the ability to adjust and restrict the air flow introduced into this system while maintaining the flow of producer gas at maximum levels at all times.

The system of the present invention has been found to be particularly useful in applications using down draft producer gas systems wherein the gas produced by the system is consumed as it is produced. The natural draw produced by the manifold vacuum in the engine pulls both the gas and the air into the carburetor, eliminating any need for pressurization of the producer gas as it is fed into the engine.

While the producer gas often has an energy rating of as low as 1/10th that of conventional gaseous fuels, application of the present invention has permitted typical internal combustion engines to operate at approximately 50% of their rated power.

A detailed description of the preferred embodiment follows.

DETAILED DESCRIPTION

Figure 1:
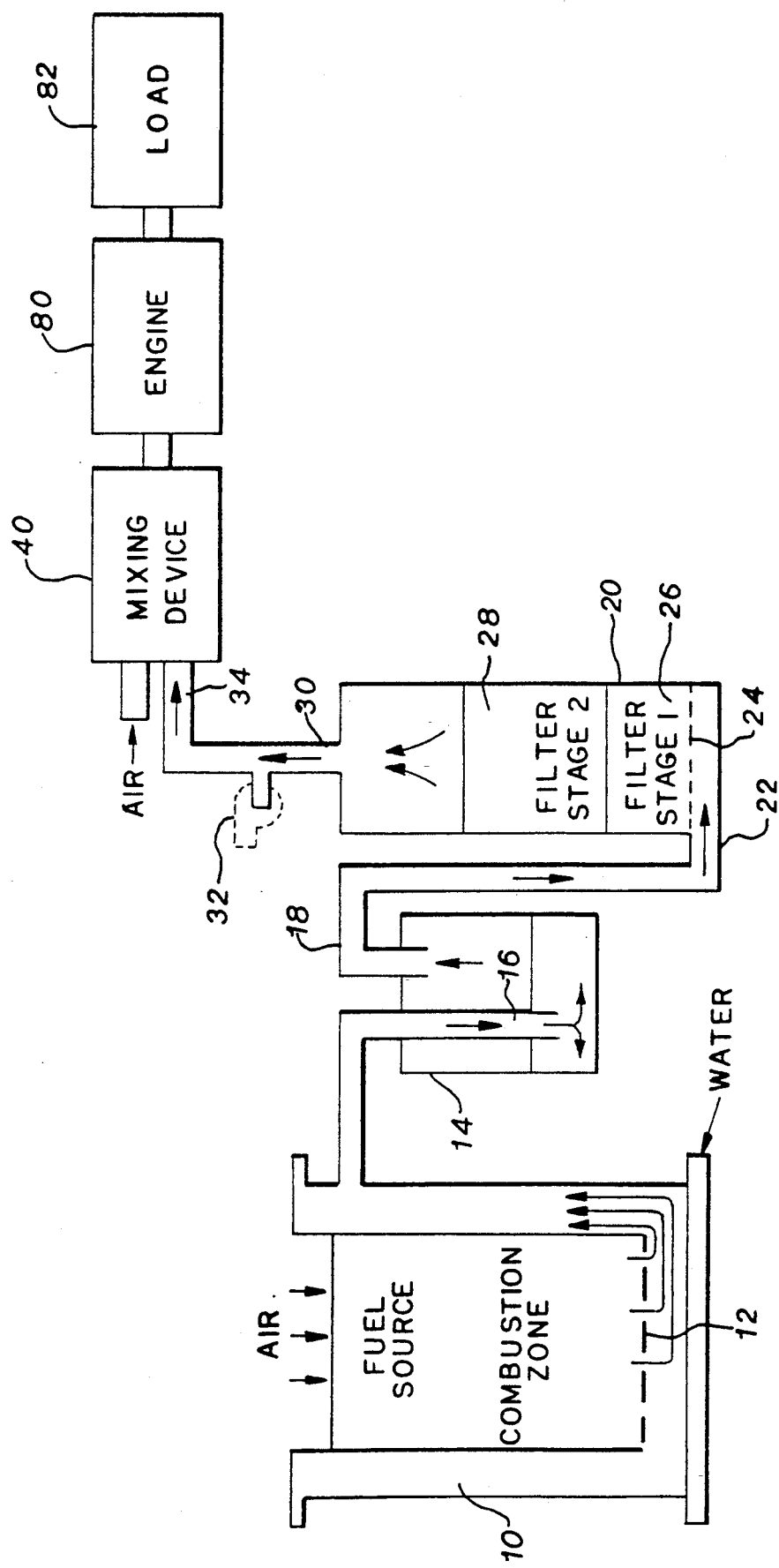
FIG. 1 is a simplified diagram of a typical producer gas power system using the air/fuel mixing device of the present invention.

The present invention is specifically designed to permit utilization of producer gas as a fuel for operating internal combustion engines in areas where standard fuels are either too expensive or in short supply. In a typical down draft system, as diagrammatically shown in FIG. 1, available waste material such as rice hulls is placed in a reactor 10. A water seal is provided in the base of the reactor, and the waste is heated and burned to create gases which drop to the bottom of the reactor. A screen 12 keeps the waste and water separated, but permits evaporating water to pass upward through the reactor and combustible gases to pass through the screen 12 and into the wet (water filled) scrubber 14 through conduit 16. The cleansed wet gases are then filtered through a two-stage filter 20 by passing the gases from conduit 22 through screen 24, a first stage filter 26 of charred rice husks or the like, and a second stage filter 28 which can comprise additional waste material such as rice hulls.

The producer gases created by this system are then introduced into supply line 30 and into a fuel/air mixing device 40 at fuel inlet 34. It is desirable to use the natural draw in order to preserve the energy generated by the system, and during operation the present system operates adequately without enhanced draw. An optional blower 32 (in phantom) may be provided to enhance gas flow during start-up. The blower is then turned off after start-up and during normal operation. The blower is not needed where fuels other than producer gas are used during start-up, as explained herein.

In a typical producer system, the gases are depressed at between 10 and 20 inches of water below atmospheric pressure. In the present invention, this low pressure supply of gas is sufficient to supply fuel to the mixing system 40 of the present invention. The air/fuel mix developed at mixer 40 is then introduced into an internal combustion engine 80 to drive a load 82, such as an irrigation pump, electric generator or the like.

Figure 2:
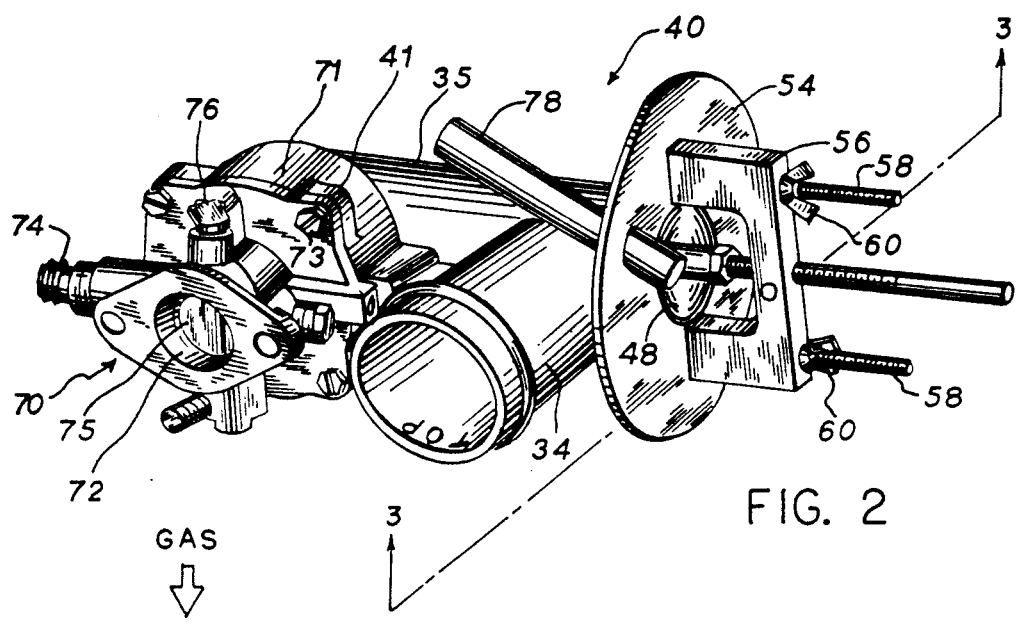
FIG. 2 is a perspective view of the mixing device.
Figure 3:
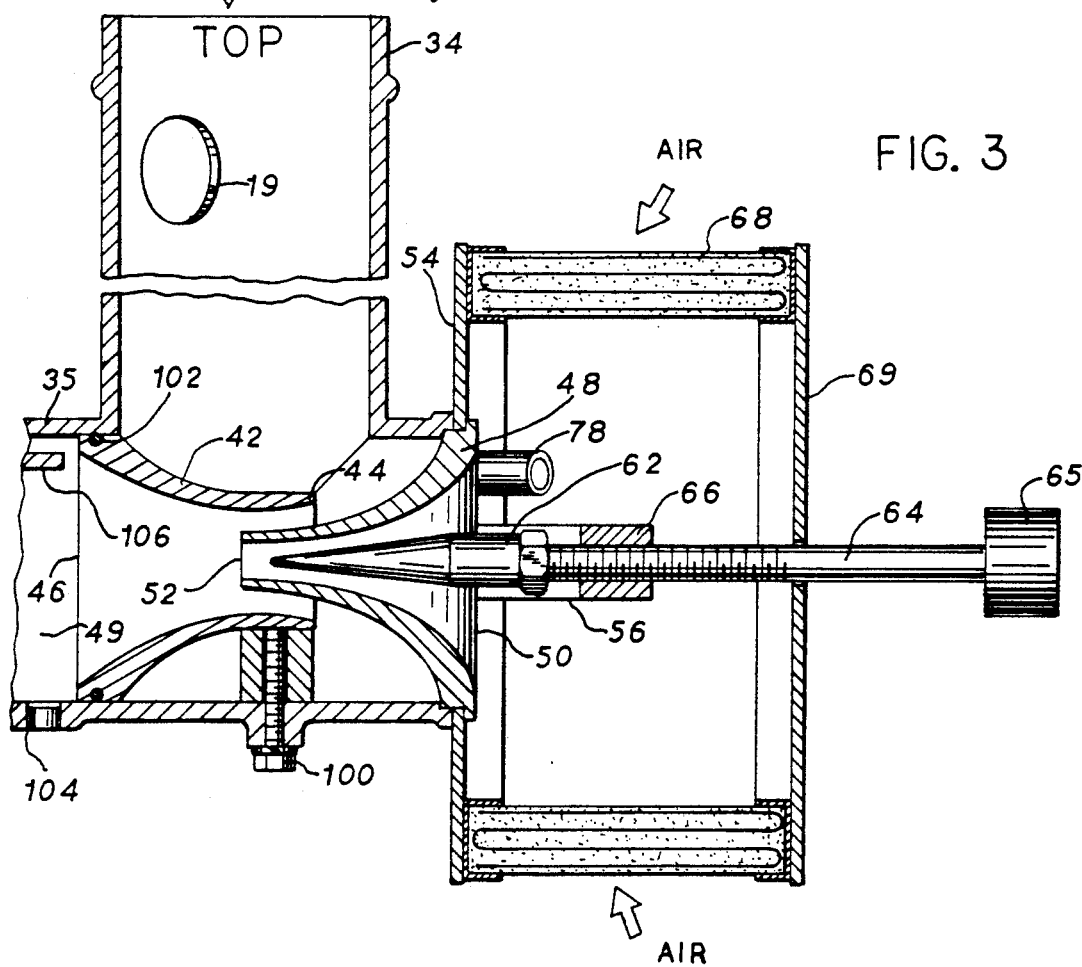
FIG. 3 is a section view taken at line 3—3 of FIG. 2.

The fuel mixing device 40 is illustrated in FIGS. 2 and 3, and in the preferred embodiment is adapted to be mounted on the air horn 34 of a standard carburetor 70 where a common air cleaner is typically provided (not shown). The carburetor 70 and throttle 76 are not modified. By way of example, a 10-12 horsepower engine sufficient to drive an irrigation pump would require a standard carburetor such as a Model 22 series carburetor manufactured by Briggs & Stratton, the assignee of the present invention. The air horn typically includes a mounting base 41 which is adapted to be mounted on the base 71 of the carburetor by means such as bolts 73.

In the illustrated embodiment, the air horn tube 34 becomes the producer gas supply line and forms a "Tee" junction with tube 35. Typically, the outboard end of tube 35 is plugged at 50. In order to adapt the air horn for the producer gas system, the plug is removed and a gas inlet venturi is mounted in the Tee in axial alignment with tube 35. The enclosed area (to the left as shown) of the gas venturi 42 forms a mixing chamber 49 which is in direct communication with the engine through carburetor throat 72.

An air inlet venturi 48 is in advance of and concentric with the gas inlet venturi 42 and is suitably mounted in the opposite end of tube 35. The restricted end 44 of the gas inlet venturi 42 is in communication with the producer gas supply tube 34 and the air supply venturi 48. The flared end 46 of the gas inlet venturi is in communication with chamber 49. The flared end 50 of the air supply venturi is in direct communication with a source of air, typically the atmosphere. The restricted end 52 of the air inlet venturi is concentric with and intercepts the restricted end 44 of the gas inlet venturi. Thus, as gas enters the venturi 42 at flare 44, it is expanded and comingled with air passing through the restriction 52. At the same time, the air is accelerated through restricting venturi 48 to promote good mixing of the fuel and air as it enters the chamber 49. In the preferred embodiment, the resulting gas inlet opening 44 and air outlet opening 52 are about the same size, that is, are an approximate 1:1 ratio.

In the preferred embodiment, a tapered needle valve 62 is located in the venturi 48 and is mounted on a threaded shaft 64. The shaft is carried in a tapped hole 66 whereby the valve is axially adjustable to selectively control the opening at the restriction 52 and the flow rate of air therethrough. The location of the needle 62 is controlled by the position of the knob 65. Thus, in the preferred embodiment the fuel flow into inlet 42 is always at maximum and the air flow is selectively controlled to tune the engine.

It is desirable to filter the air entering the venturi 48 and in the illustrated embodiment this is accomplished by providing a base plate 54 suitably mounted at the end of tube 35 with a mounting bracket 56 secured thereto. The tapped hole 66 is located in bracket 56 for carrying the needle valve 62. The bracket also includes studs 58 on which a breather cap plate 69 may be secured by means of wing nuts 68 or the like. A typical air filter 68 such as those in use on standard carburetor systems may be installed between plate 54 and plate 69. An example of such a filter element is Fram replacement filter element, part No. CA76. The knob 65 at the end of shaft 64 is removable to facilitate changing of the filter element.

Crankcase ventilation, which is generally provided in carbureted systems by venting the crankcase back to the air cleaner, is replaced by vent tube 78. Tube 78 is connected directly to the crankcase by a conduit (now shown) and is exited inside the filter element through base plate 54. Also, a breather vent 79 is typically provided in the gas supply tube 34. In the preferred embodiment this is plugged when the system is operating on producer gas.

As shown in FIG. 2, the mixing device 40 is mounted on a standard carburetor 70 at air horn plate 71. The mixing chamber 49 of the mixing device is in direct communication with the throat 72 of the carburetor. The carburetor is then mounted in typical fashion on the intake manifold of an internal combustion engine. In order to facilitate cold starting of the engine, a fuel line 74 is provided for introducing gasoline or other conventional fuels into the carburetor. Once the engine has achieved running condition, the gasoline supply may be cut off and the engine will run continually on the producer gas/air mix provided by mixing device 40. The speed of the engine may be adjusted at throttle 76 which controls the butterfly valve 75. Any additional vents in the carburetor are plugged when the mixing device is added. The gasoline supplied at line 74 is optional and other means for cold starting the engine may be utilized. A major advantage of the system of the present invention is that the throttle system 76 of the standard carburetor is not altered. This permits gasoline starting in the typical fashion and conversion over to producer gas without interruption.

The present invention provides a convenient kit for field adapting a standard carbureted engine with the modifications necessary to convert it to producer gas. In order to complete the conversion, the air horn is modified as follows: The plug at 50 is removed and the gas venturi is inserted and held in place by bolt clamp 100 or the like. The bolt clamp 100 is inserted in the through hole where the air cleaner bolt clamp was previously carried. An O-ring seal 102 assures a tight fit. Vent 104 is also plugged. The base plate 54 and the air venturi are then placed over the open end of tube 35, as shown, and clamped in place by the studs 58 which are used to secure the needle valve 62 and air cleaner 68 in place, as previously described. It may be necessary to modify the bowl vent 106 in order to install the gas venturi. However, it is desirable to maintain the bowl vent in a functional mode in order to facilitate start-up with gasoline.

In tests using the mixing device of the present invention with a producer gas fuel having an energy rating of about 1/10th that of natural gas, a typical internal combustion engine produced a power output at about 50% of its rated power. A Briggs & Stratton 11 horsepower engine model No. 19 was used in combination with a Briggs & Stratton Model 22 carburetor. In the test, the largest model standard carburetor adaptable to the engine without modification was used to maximize the flow of producer gas and air into the system. The mixing device was then mounted at the air horn and carburetor vents were plugged while the producer gas had an energy rating of about 10% that of natural gas, approximately 50% of the rated power of the engine was achieved.

The present invention provides a suitable power plant for operating equipment in areas where fuel is in short supply by manufacturing producer gas from the materials at hand. It is particularly advantageous in its preferred form since the fuel mixing device is readily adaptable and may be field fitted to existing equipment.

While a preferred embodiment of the invention is described herein, the invention includes the various modifications and alterations included within the scope and the spirit of the appended claims.

What is claimed is:

1. An air/fuel mixing device for delivering a mixture of air and producer gas to an internal combustion engine comprising:
    (a) a mixing chamber in communication with the engine;
    (b) an air supply component in communication with the mixing chamber and having opposite inlet and outlet ends for supplying a source of air to the mixing chamber; and
    (c) a producer gas supply component in communication with the mixing chamber and having opposite inlet and outlet ends, the inlet being concentric with and surrounding the outlet end of the air supply component, whereby the air and gas are commingled in the gas supply component and in advance of the engine.

2. The apparatus of claim 1, wherein the air supply component includes a control means for selectively adjusting the rate of air flow into the mixing chamber.

3. The apparatus of claim 1, wherein the air supply component comprises an air venturi having a flared end and a restricted end, with the restricted end in communication with the mixing chamber and the flared end in communication with a source of air.

4. The apparatus of claim 3, including a control means for selectively adjusting the rate of air flow into the venturi inlet of the air supply component.

5. The apparatus of claim 4, wherein said control means comprises a tapered needle valve concentric with and axially movable relative to the air venturi.

6. The apparatus of claim 1, wherein said gas supply component comprises a gas venturi having a flared end and a restricted end, with the flared end in communication with the mixing chamber and the restricted end in communication with a source of producer gas, and wherein the air supply component comprises an air venturi concentric with the gas venturi and having a restricted end and a flared end, with the restricted end in communication with the mixing chamber and the flared end in communication with a source of air.

7. The apparatus of claim 6, wherein the functional cross section area of air supply component inlet opening and the producer gas supply component inlet opening are approximately equal.

8. The apparatus of claim 6, including means associated with the air venturi for adjusting the rate of air flow therethrough.

9. The apparatus of claim 8, including means in communication with the air venturi for filtering the air supplied to the intake chamber, and further including vent means in communication with said engine for continuously venting the engine to the air supply inlet.

10. An air/fuel mixing device for delivering a mixture of air and producer gas to the throat of a carburetor for an internal combustion engine, the carburetor including an air horn at the opening of the throat, the mixing device comprising:
    (a) a mixing chamber mounted on the air horn of the carburetor;
    (b) a producer gas supply component in communication with the mixing chamber, comprising a gas venturi having a flared end and a restricted end, with the flared end in communication with the mixing chamber and the restricted end in communication with a source of producer gas;
    (c) an air supply component in communication with the mixing chamber, comprising an air venturi concentric with and surrounded by the gas venturi and having a flared end and a restricted end, the restricted end in communication with the mixing chamber and the flared end in communication with a source of air; and
    (d) means associated with the air venturi for adjusting rate of air flow therethrough.

11. The apparatus of claim 10, including:
    (a) means in communication with the air venturi for filtering the air supplied to the mixing chamber; and
    (b) vent means communicating with the engine and the air venturi for venting the engine into the air supply inlet.

12. The apparatus of claim 11, wherein the vent means bypasses the filter means.

13. The apparatus of claim 10, wherein the carburetor includes a fuel inlet and throttle in communication with the throat for introducing an alternate supply of fuel into the carburetor independently of the producer gas.

* * * * *